United States Patent [19]
Koike

[11] Patent Number: 4,547,873
[45] Date of Patent: Oct. 15, 1985

[54] SIMPLIFIED SOUND REPRODUCING DEVICE

[75] Inventor: Eishi Koike, Sagamihara, Japan

[73] Assignee: Ozen Corporation, Tokyo, Japan

[21] Appl. No.: 645,434

[22] Filed: Aug. 29, 1984

[30] Foreign Application Priority Data

Aug. 30, 1983 [JP] Japan .................. 58-158183

[51] Int. Cl.$^4$ .................. G11B 27/10; G11B 3/78; G11B 17/00
[52] U.S. Cl. .................. 369/65; 369/67
[58] Field of Search .................. 369/63, 65, 66, 67, 369/31

[56] References Cited

U.S. PATENT DOCUMENTS

| | | | |
|---|---|---|---|
| 3,636,655 | 1/1972 | Porter et al. | 369/65 |
| 3,658,346 | 4/1972 | Stern et al. | 369/65 |
| 3,774,914 | 11/1973 | Porter et al. | 369/63 |
| 4,404,667 | 9/1983 | Koike | 369/65 |
| 4,433,404 | 2/1984 | Watanabe | 369/67 |

Primary Examiner—Steven L. Stephan
Attorney, Agent, or Firm—Basile Weintraub Hanlon

[57] ABSTRACT

A simplified sound reproducing device having a record disc 5 having a plurality of record grooves is driven by a constant torque spring motor 2. A turntable 3 and the record disc 5 are frictionally assembled so that relative slippage occurs between them in the direction of their rotation when an extra force is applied to the system. A sound reproducing member 10, applying a stylus pressure to a pickup 6, has a holding piece attached thereto which contacts the reverse face of the record disc 5 and stops its rotation when the sound transmitting member 10 is lifted up by tension exerted by a stretched pull string 14, when the string 14 is pulled to wind the constant torque spring motor. By virtue of this construction, the angle of rotation of the turntable 3 and the record disc 5, are shifted from each other so that the introductory part of the record groove, next to the one just completed, can be placed under the pickup 6 now returned to the starting point of sound reproduction, and played.

3 Claims, 3 Drawing Figures

SIMPLIFIED SOUND REPRODUCING DEVICE

BACKGROUND OF THE INVENTION

1. Field of the Invention

The present invention relates to a simplified sound reproducing device. More particularly, this invention concerns a sound reproducing device driven by a constant torque spring motor which has a record disc carrying a plurality of recorded grooves which are to be successively reproduced.

2. Description of the Prior Art

Record discs having a plurality of recorded grooves, generally, have a plurality of selection bars at positions outside the casing corresponding in number to the number of record grooves. Such devices also have a control ring or rings having a cam or cams which function in response to the operation of the selection bars. This results in a considerably complicated construction, as illustrated in Japanese Patent Publication No. Sho 51 (1976)-19763.

In such conventional simplified sound reproducing devices it is possible to select a desired groove exactly. But, as noted, such devices require a complicated construction and careful attention for smooth functioning. Additionally, such devices require a large number of components and parts and, necessarily, considerably increased cost.

This invention aims to obviate various drawbacks of the conventional simplified sound reproducing devices as mentioned above.

Accordingly, an object of the present invention is to provide a sound reproducing device capable of successively reproducing items recorded on a record disc having a plurality of record grooves.

Another object of this invention is to provide a device of simplified construction comprised of a small number of parts which is capable of selecting a plurality of recorded grooves.

A further object of the invention is to enable successive selection of a plurality of recorded grooves by a single winding of a constant torque spring motor.

SUMMARY OF THE INVENTION

This invention relates to a simplified sound reproducing device driven by a constant torque spring motor for playing a record disc having a plurality of recorded grooves. In order to accomplish successive reproduction of the recorded grooves, the turntable and the record disc are stationarily connected under frictional force, but can be shifted in the direction of rotation by external force applied to the turntable.

A holding piece is attached to a sound transmitting member imparting a stylus force to a pickup. The holding piece engages the reverse face of the record disc stopping its rotation, when the sound transmitting member is lifted upward by the tension exerted by a pull string used for winding the constant torque spring motor.

In winding the constant torque spring motor, the angle of rotation of the record disc is shifted from the angle of rotation of the turntable. Thus, the introductory part of the recorded groove located subsequent to that which has already been reproduced can be placed in a position where the pickup, which has already returned to the reproduction starting point, is able to engage it.

Thus, the present invention enables successive reproduction of a plurality of recorded grooves by pulling the pull string. Moreover, the device can be constructed inexpensively with a small number of parts.

For a more complete understanding of the present invention reference is made to the following detailed description and accompanying drawing wherein like reference numerals refer to like parts throughout the several views and wherein:

DETAILED DESCRIPTION OF THE PREFERRED EMBODIMENTS

Figure 1:
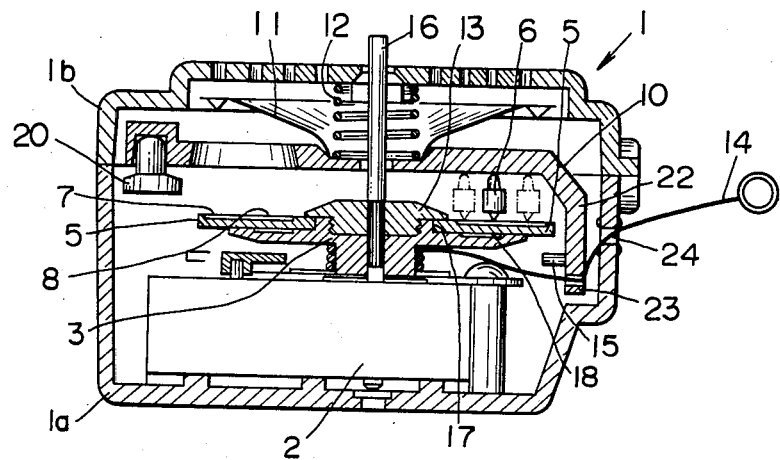
FIG. 1 is a half-cut, cross-sectional elevation of a sound reproducing device of the present invention.

As shown in FIG. 1, a second reproducing device includes a casing 1 defined by a housing 1b coupled, with its open end down, upon a chassis 1a. A constant torque spring motor 2 is fixedly attached, as a unit, on the inner bottom face of the chassis 1a. The constant torque spring motor 2 has an output shaft 16. The shaft 16 extends further upward and functions, also, as a center pin for a turntable 3.

The turntable 3 carries a concentrically coupled flat shaft 13 on its central part. The lower part of the turntable 3 defines a reel for taking up a pull string 14. The upper surface of turntable 3 is formed with an annular recess which defines an annular holding groove 17 for frictionally holding a record disc 5. The turntable 3 and the flat shaft 13 are concentrically and tightly fixed to the output shaft 16 by inserting the output shaft 16 through central holes in the turntable 3 and flat shaft 13.

The turntable 3 carries the record disc 5 held in the annular holding groove 17, the width of which is adjustable via a pair of screw threads which couple the turntable 3 and the flat shaft 13 together. The upper surface of the turntable 3 has a slightly indented annular recess 18 which is filled with a pasty material (e.g. high viscosity grease or the like). This ensures the synchronous rotation of the record disc 5 and turntable 3 under normal load and the slippage of the record disc 5 when a particular appropriate load is applied to the record disc.

A pickup 6 is disposed above the record disc 5. The pickup 6 makes a reciprocal swinging movement between the starting point 7 and the end point 8 of sound reproduction.

Figure 2:
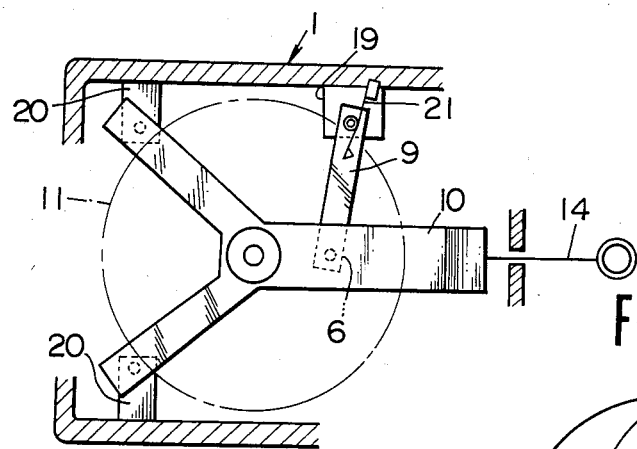
FIG. 2 is a plan view of the device hereof with certain parts omitted for clarity.
Figure 3:
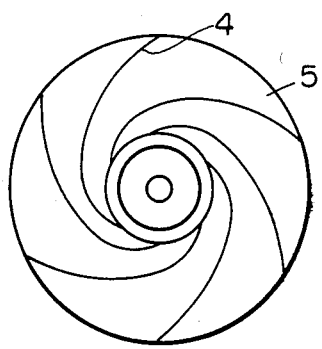
FIG. 3 is a plan view of a record disc used in the practice of the present invention.

As shown in FIG. 2, the pickup 6 is attached on the tip end of a tone arm 9 which is, itself, swingably disposed, at its rear end, on a shelf-like member 19. A return spring 21 is attached to the swivel axis of the tone arm. Thus, the pickup is normally biased in two directions; one toward the starting point of reproduction 7, and the other away from the upper or recorded face 4 of the record disc 5.

As shown in the drawing, a sound transmitting member 10 is disposed in such a manner as to confront the record face 4 of the record disc 5. The sound transmitting member 10 extends between the starting point 7 and the end point 8 of sound reproduction. As shown in detail in FIG. 2, the sound transmitting member 10 has a capital "Y"-like configuration. Each foremost end of the two bifurcated arms of the member 10 is swingably supported by one of a pair of shelf-like members 20, each disposed laterally from a respective sidewall of the casing 1. The portion of the sound transmitting member 10 above the pickup 6 is contacted and supported by the upper face of the pickup 6 and is able to approach toward or away from the record face 4 of the record disc 5. The sound transmitting member 10 carries a speaker cone 11 fixed on its upper face.

The forward end portion of sound transmitting member 10 extends beyond the pickup 6 and is bent downward below the level of the reel portion on the turntable 3 to define a downwardly extending portion 22. At the foremost end portion of this downwardly extending portion 22 is a string hole 23 through which the pull string 14 is passed. The pull string 14 passes outside the casing 1 through another string hole 24 located at the same level as the record disc 5.

On the inside surface of the downwardly extending portion 22, and slightly above the string hole 23, a holding piece 15 is integrally formed therewith. The holding piece projects laterally inward, such that, in its raised position it can contact the lower face of the outer part of the record disc 5.

When in use, the sound transmitting member 10 is urged toward the record face 4 of the record disc 5 by a stylus force spring 12. The spring 12 is compressed between the upper face of the sound transmitting member 10 and the reverse face of the housing 1b.

FIG. 1 shows the device in operation with the pickup 6 in a position halfway between the starting point 7 and the end point 8 of sound reproduction. When the pickup 6 arrives at the end point 8 of sound reproduction, proximate the flat shaft 13, as shown in phantom, the constant torque spring motor 2 is fully released. Thus, the turntable 3 and the record disc 5 will both stop rotating.

Subsequent pulling of the pull string 14 fully winds the constant torque motor causing rotation of the turntable 3. As pull string 14 is pulled, the force given by the taught pull string 14 lifts the sound transmitting member 10 upward against the stylus force spring. As a consequence, the stylus force applied to the pickup 6 is released allowing the pickup to return to the starting point of sound reproduction 7, as shown in FIG. 1. This operation raises the sound transmitting member 10. The holding piece 15, which projects from the downwardly extending portion 22 located on sound transmitting member 10, engages the reverse face of the record disc 5 and stops its rotation. This sudden stop results in some slippage as the record disc 5 is now free to move relative to the turntable 3.

When pickup 6 has returned to the starting point 7 of sound reproduction, it is positioned to contact a introductory portion of a record groove, which is different from that which has just been reproduced. When the winding string 14 is released, the sound transmitting member 10 will descend due to the spring force exerted by the stylus force spring 12. The stylus force spring 12 imparts a stylus force to the pickup 6 at the same time as the constant torque spring motor 2 begins rotating both the turntable 3 and the record disc 5.

The pasty material filling in the annular recess 18 maintains the record disc 5 securely on the turntable 3 during such rotation. When the pickup 6 is returned to the starting point 7 of sound reproduction, the large moment of force attained in the operation causes an effective slippage of the record disc 5 relative to the turntable 3. In this way, a different record groove from that which has just been reproduced can be selected for the next sound reproduction.

Having, thus, described the invention, what is claimed is:

1. A simplified sound reproducing device comprising:
   a casing;
   a turntable having a central shaft housed in the casing;
   a constant torque spring motor disposed in the casing for driving the turntable;
   a record disc having a record face mounted on the turntable, the record disc having a plurality of record grooves each groove positioned in the direction of rotation of the turntable at a point different from adjacent grooves, each groove having a starting point and an end point of sound reproduction;
   a tone arm mounted in the casing which travels between a starting point and an end of sound reproduction;
   means for urging the tone arm toward the starting point of sound reproduction and away from the record face of the record disc;
   a pickup located on the tone arm;
   a sound transmitting member disposed on the pickup, the sound transmitting member being capable of approaching or moving away from the record face of the record disc;
   a speaker cone attached to the sound trasmitting member;
   a stylus force spring disposed in the casing for imparting a stylus force to the pickup through the sound transmitting member;
   a pull string wound around the central shaft of the turntable which energizes the constant torque spring motor when pulled, the pull string simultaneously raising the sound transmitting member by the force against the urging of the stylus force spring and releasing the stylus force imparted on the pickup;
   means for frictionally coupling the turntable and record disc giving rise to a slippage in the direction of rotation between the turntable and the disc under a certain extent of force; and
   a holding piece engaging the reverse face of the record disc for stopping its further rotation when the sound transmitting member is raised upward.

2. The sound reproducing device of claim 1 which further comprises: an annular holding groove defined in the central part of the turntable which holds the record disc to the turntable.

3. The sound reproducing device of claim 1 which further comprises: a gripping substance contained in the annular holding groove.

* * * * *